No. 668,159. Patented Feb. 19, 1901.
J. H. CAMPBELL.
DESICCATED MILK AND METHOD OF MAKING SAME.
(Application filed Mar. 17, 1900.)
(No Model.)
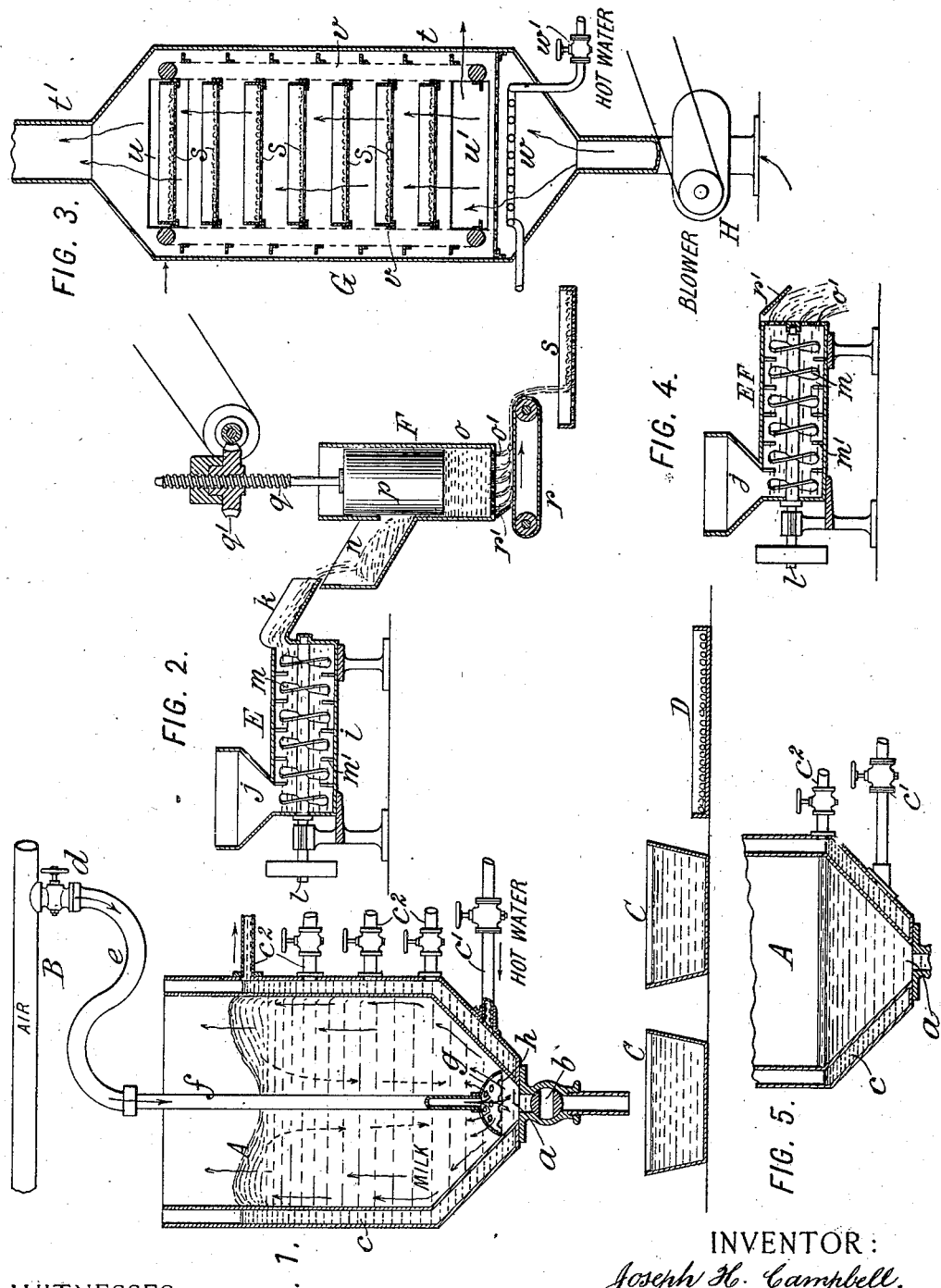
WITNESSES:
INVENTOR:
Joseph H. Campbell,
By Attorneys,

UNITED STATES PATENT OFFICE.

JOSEPH H. CAMPBELL, OF NEW YORK, N. Y.

DESICCATED MILK AND METHOD OF MAKING SAME.

SPECIFICATION forming part of Letters Patent No. 668,159, dated February 19, 1901.

Application filed March 17, 1900. Serial No. 8,979. (No specimens.)

*To all whom it may concern:*

Be it known that I, JOSEPH H. CAMPBELL, a citizen of the United States, residing in the city, county, and State of New York, have invented a certain new and useful Improved Milk Product and Process of Producing the Same, of which the following is a specification.

This invention relates to a desiccated product consisting of the non-fatty solids of milk separated from the water of the milk and to the treatment of milk for the production of such a product. My invention aims to produce such a product in which all the non-fatty solids of the milk shall be retained and in which the casein or other proteids of the milk shall retain all their original peptogenic properties and be readily soluble in water.

In making a desiccated milk it is primarily necessary, in order to guard against fermentation, to remove the milk-fat. Skimmed milk contains ten per cent. or over of milk solids. In practice, however, ordinary skimmed milk has scarcely more than nine per cent. of solids. These non-fatty solids consist of milk-sugar, proteids, and mineral matters, the latter including potash, soda, lime, magnesia, phosphoric acid, and chlorin. Of the proteids casein is the principal one, amounting in weight to nearly four per cent. of normal milk, although other proteids, notably albumen and galactin, are present, aggregating nearly one per cent.

Various attempts have been made for many years past to desiccate milk or reduce it to the condition of a dry powder or cake; but prior to my successful accomplishment of this result all such efforts, so far as I am aware, have been failures.

It has been proposed to concentrate entire or unskimmed milk to dryness; but the presence of the milk-fats in such case effectually prevents desiccation, the product being of a putty-like or waxy consistency and being extremely liable to fermentation, so that it cannot be kept for any length of time without the exercise of great precaution.

All attempts to concentrate milk to dryness which have succeeded in producing a desiccated product have involved the subjection of the milk to boiling, either under atmospheric pressure or *in vacuo*. In either case so high a temperature has been employed as to precipitate the alkaline or basic constituents of the milk and coagulate the milk albumen or casein, rendering it insoluble in water and unsusceptible to the action of pepsin or rennet—that is, non-peptogenic. Hence such products have proved of but little practical value, because the desiccated milk would not readily dissolve in water for the re-formation of liquid milk, and even such of it as would so dissolve would resist rennet coagulation, and hence would have but very little value as a food product.

It has been proposed to concentrate milk by evaporation at a heat maintained below 140° Fahrenheit with a view to preventing the coagulation of its proteids into insoluble form; but all attempts of this kind have met with failure, because the temperature proposed is highly favorable to fermentation and the milk has soured before it could be concentrated. Attempts to arrest this fermentation by the use of antiseptics have of course been objectionable and produced a product of no practical value.

All other proposed methods of desiccating milk have involved the loss of valuable portions of the milk solids, so that the product has not been a "desiccated milk," correctly so called, but a desiccated constituent extracted from milk. For example, it has been proposed to subject milk to a very low temperature, so as to freeze out its aqueous portions, and then separate the non-frozen from the frozen portions, and subsequently to evaporate the non-frozen portions by currents of cold air; but such freezing removes not merely the water, but a large proportion of the mineral constituents and milk-sugar which are dissolved in the water, so that the final product consists of but little more than the casein of the milk. Another process of recovering the casein consists in treating the milk with rennet, separating the whey, and drying the curd; but the separated whey carries off some of the most valuable constituents of the milk—namely, the milk-sugar and mineral matters—and also a large proportion of the proteids.

Prior to my invention no one, so far as I am aware, has succeeded in producing a desiccated milk wherein are combined the non-fatty solids of milk unchanged in proportion or character and wherein the proteids are retained of undiminished solubility and susceptibility to peptic action, or, in other words, a dried milk which is readily soluble in water and as digestible as fresh milk. I have found that in order to produce such a product in perfection it is necessary to effect the concentration of the milk at a temperature in the neighborhood of 100° to 120° Fahrenheit and well below 140° Fahrenheit, the point at which coagulation of albumen commences, and that because this temperature is most favorable to fermentation it is necessary to perform the evaporation with great rapidity and by means which shall check the activity of the lactic ferments. The process naturally divides itself into two stages—the first that in which the milk is treated as a liquid and the second that in which it is treated as a semisolid. The first stage involves the concentration of the milk from its original liquid form down to approximately one-fourth its original weight or until it reaches the consistency of a paste or very thick cream. The second stage is that in which it is reduced from the pasty consistency to that of a dry solid substance. During both stages the temperature must for a perfect product be maintained considerably below 140° Fahrenheit and in the neighborhood of 100° to 120° Fahrenheit, and during both stages there is constant liability to souring of the product. The slightest fermentation defeats the object in view, since it imparts a cheesy odor and flavor to the product. The first stage of the process may be conducted according to the method set forth in my application, Serial No. 22,105, filed June 30, 1900. The process of my present invention relates more particularly to the second stage of the process, and hence provides an improved method beyond that set forth in my said application for reducing the milk from the consistency of paste to the solid form, as well as an improvement in the details of the first stage.

To enable others to practice my invention, I will proceed to describe the entire process, including the first stage as embraced in my said application above referred to and the second stage.

I preferably operate as follows:

First stage: I take fresh skimmed milk, preferring that skimmed by a centrifugal creamer for the most perfect elimination of the milk-fats. I may add to the milk a small quantity of dilute alkali—as sodium bicarbonate, for example—sufficient to neutralize it if it shows any acid reaction or even sufficient to give it a very slight alkaline reaction. This treatment with alkali, however, is not essential. The milk is heated to a temperature approximating 100° Fahrenheit and is then maintained at this temperature during the entire concentrating process. The milk is heated, preferably, by means of a hot-water jacket surrounding the tank in which the concentration is effected or by circulating hot water through a coil within this tank. In order to effect the concentration, I blow a blast of air into the milk, which circulates through the liquid and takes up moisture therefrom, at the same time violently agitating the milk. By this means I am able to effect a rapid evaporation at a very low temperature. The drier the air the more rapid the evaporation, and I may provide means for drying the air before it is forced into the milk; but this is not ordinarily necessary, as atmospheric air, unless exceptionally humid, is sufficiently dry for this purpose. This method of evaporation has the important advantage that the concentration may be performed at a temperature so low as to make no change in the casein or other albuminous matter of the milk. For safety I keep well below 140° Fahrenheit, the point at which coagulation of albumen commences, and, except at the early part of the treatment, even below 120° Fahrenheit. Foaming is reduced and practically avoided by introducing the air at the bottom of the tank of milk in such direction that it imparts to the entire body of liquid a rolling motion, causing the milk to rapidly circulate and quickly freeing the air-bubbles from the superincumbent liquid. The blast of air has the effect of keeping the milk in constant motion, so that it requires no stirring and insures that the evaporation shall proceed uniformly throughout the mass. The air has also the effect of increasing the solubility of the proteids of the milk—a result which may be due to an oxidizing action. The evaporation by air injection is continued until the milk becomes an aerated batter or paste so thick that it will barely flow, or, say, for example, about the thickness of the batter used for making buckwheat griddle-cakes. The concentration by air injection may be continued to a greater density—if desired, even to the point where the paste becomes so thick that it fails to close together, but instead forms holes or fissures through which the air freely escapes, so that the agitation by reason of the air-blast becomes ineffective; but practically it is better to discontinue the air-blast at the lesser density just indicated. Toward the end of the process the application of heat to the milk through the water-jacket or otherwise is discontinued, so that the milk is rapidly cooled by the air-blast. It may, however, be cooled otherwise after discontinuing the blast. As improvements in this first stage I preferably start the process with the milk at a higher temperature than that which it will stand in the later stages of the process and gradually reduce the temperature as the concentration progresses, the range being from about 120° to about 90° Fahrenheit, whereby a faster action is obtained than if the process were carried on from beginning to end at the same temperature. I maintain a high drop between the temperature in the water-jacket and that in the milk, the desired temperature of the latter being obtained by a variation in the volume of the air-blast, the temperature in the water-jacket ranging from about 150° to about 125° Fahrenheit, the process being hastened by such high drop. I cause the air to travel upward along the walls of the vessel, scouring the same thoroughly and permitting the high drop above mentioned without danger of burning the portion of milk near the walls, and I maintain the water-level in the jacket at approximately that of the milk or below the same to prevent heating of the walls above the level of the milk and solidification and burning of the particles of milk which are thrown against the walls above the general surface.

Second stage: The paste or batter formed during the first stage is then preferably removed from the evaporating-tank into any suitable storage vessels and is left standing for a few hours, being preferably kept in a cool place, say, at a temperature not exceeding 60° Fahrenheit. During this time the paste or batter "sets" or stiffens into a semisolid mass, which will break with a crumbly fracture like putty. The milk is then removed from the storage vessel and is subdivided in any suitable way, so as to expose it to the air, preferably by breaking it up into lumps, which are spread out on trays for a few hours, during which time the setting or stiffening continues and considerable internal moisture passes to the surface and evaporates. The lumps should be turned at intervals to expose all portions to the air. The result of this preliminary drying is to leave the material in a somewhat non-homogeneous condition, the proportion of moisture varying between the exterior and interior portions of the lumps. Any other means of subdividing for this preliminary drying may be substituted—as, for example, by spreading the material out into thin sheets or cutting it into strips or small cubes or otherwise; but in either case practically the same non-homogeneous condition results. The milk is next subjected to a treatment designed to render it homogeneous, so as to effect an equal distribution of moisture and the breaking up of any lumps or hard portions that may tend to form. For this purpose the mass is placed in any suitable vessel and subjected to a forcible stirring or kneading action. This is preferably done in a pug-mill or kneading-trough by means of inclined arms or blades which repeatedly cut through the mass and stir it and preferably continually force it forward with a screw-like action. The operation is essentially the same as the pugging of clay, and a pug-mill of essentially the same character may be employed. The next step is to uniformly subdivide the material in order to expose it effectively to the action of the air. To this end it may be rolled out into thin sheets or cut into strips or shreds; but it is preferably treated in the same way as is practiced in the production of vermicelli—that is, it is forced under pressure through small holes, from which it issues as slender threads or strings of a dough-like consistency. The effect of this treatment is to force considerable moisture to the surface of the strings or shreds, whence it may readily evaporate. The exuding shreds are then placed upon suitable trays or upon an endless apron or other support, and the material thus supported is subjected to currents of air. Preferably the trays are placed in a drier through which a forced current of air is passed, the air being at a temprature approximating 100° Fahrenheit. Cold air may be employed, although the drying is not so rapid. A low degree of heat may be applied to the lower part of the drier to advantage. This drying operation may be continued until the material is bone dry—that is, until the shreds or strings of milk become hard, solid, and brittle. I prefer, however, to interrupt the drying operation after a short time—say after drying for three or four hours or until all surface moisture has disappeared from the shreds and while the material is still plastic—and to subject the material in this condition to a second pugging operation, followed by a second subdivision, as by forcing it into vermiform shreds or strings, which latter are again placed upon trays and returned to the drier or, preferably, placed in a separate drier, whereupon the drying operation is continued until the material is bone dry, the shreds or strings or rods of the milk being hard and brittle and when broken open presenting no appearance of moisture and no plastic quality. The material thus produced is nearly white, having a faint yellow tinge, is hard and brittle, and breaks with a fine granular fracture. The final step in the process is the grinding of the solid milk to a fine powder or flour.

The product of this process is a nearly pure white powder which consists of the non-fatty solids of the milk unchanged in proportion and unimpaired in character, the milk powder being readily soluble in water, and when so dissolved its casein and other proteids being peptogenic or susceptible of peptic action and its lime salts and other mineral matters being in their original condition as to solubility. The casein in my desiccated milk is unchanged from that in the natural milk except that it has become slightly more soluble and peptogenic.

My milk-powder is non-hygroscopic and is so nearly anhydrous as to present every appearance of being perfectly dry. It resembles white wheat-flour in consistency and may be handled, packed, transported, and kept in the same manner and without necessity for other precautions than those necessary with such flour.

Instead of forming a desiccated milk-powder the milk product may be formed into cakes. For this purpose the powder may be prepared as already described and then pressed in molds, or the stiff dough or paste may be rolled into sheets or pressed into cakes, and the sheets or cakes thus formed may then be slowly dried until the material becomes quite hard. In any event the heat used in drying should not exceed 100° to 120° Fahrenheit and to produce a perfectly soluble product must be below 140° Fahrenheit.

For removing every trace of fatty matter the desiccated milk may be treated with alcohol or ether to dissolve out the slight residue of fatty matter; or it may be treated with ammonia or other mild alkali to saponify such fatty residue.

An important advantage of the process herein described is that it tends to sterilize the product. Many deleterious microbes are destroyed by long-continued oxidation, by persistent agitation, and by desiccation. My process effectively combines all three agencies.

To enable those skilled in the art to more readily practice my invention, I will proceed to describe a suitable form of apparatus for facilitating the process thus set forth with reference to the accompanying drawings, wherein—

Figure 1 is a vertical transverse mid-section of the concentrating vessel. Fig. 2 is a vertical section of the apparatus for stirring or pugging the product and forming it into strings or shreds. Fig. 3 is a vertical transverse section of a suitable drier for completing the desiccation. Fig. 4 is a vertical mid-section of a modification of the apparatus shown in Fig. 2. Fig. 5 is a section similar to Fig. 1, showing the end of the first stage.

Referring to Fig. 1, let A designate a tank or vessel, the lower portion of which is conical, converging to an outlet at $a$, which is closed by a cock or valve $b$, from which any suitable discharge-pipe may be led. The tank A is surrounded by an outer vessel, forming a hot-water jacket $c$, to which leads a hot-water pipe $c'$ from any suitable source and provided with any suitable means for causing the hot water to circulate and with any suitable means for varying or controlling its temperature. The water may be discharged from the jacket through any one of a series of pipes $c^2$ above.

B is an air-pipe into which air under suitable pressure is pumped by any suitable air-forcing apparatus. This pipe has a branch $d$ to each tank A, each branch being provided with a valve or stop-cock and connecting by any suitable pipe, preferably a flexible hose $e$, with a stand-pipe $f$, which passes down through the middle of the tank and is formed on its lower end with a disk or flange $g$, constituting a hollow foot. The pipe $f$ is removable for cleaning, and when in place its disk $g$ fits against the conical wall of the tank and forms beneath it an air-chamber $h$.

In starting the operation the milk to be treated is run into the tank A, its valve $b$ being closed. Hot water at a temperature preferably of about 150° Fahrenheit is then circulated through the jacket $c$ until the milk is raisd to a temperature of 120° Fahrenheit or thereabout. The pipe $f$ being put in place, the valve $d$ is opened to admit air to this pipe. The compressed air thus admitted expels the milk, or most of it, from the chamber $h$ and escapes through the perforations in the disk $g$ and around the edges of this disk and passes up through and around the mass of milk, as shown by the full-line arrows. The greater part of the air will pass up along the inner walls of the tank, thereby setting the milk into upward circulation along its outer portions and causing it to work down toward the center, as shown by the dotted arrows, thus maintaining a rolling motion or rotary circulation of the mass of milk by which the air-bubbles which permeate the liquid are constantly set free, and hence the tendency of the mass to foam is greatly reduced. The temperature in the jacket being considerably higher than that of the milk in the tank, there is a constant tendency of the milk adjacent to the walls to deposit a thin coating of milk solids thereon, which quickly results, by reason of the non-conducting properties of such coating, in obstructing the escape of heat into the liquid, and the imprisoned heat then acts to bake it upon the surface. This baking or incrustation is accompanied by a browning or discoloration of the milk solids, affecting the milk-sugar and probably the casein and rendering the latter insoluble and non-peptogenic. The incrustation and discoloration are prevented by the air-blast, the greater portion of which is directed against and along the inner surfaces of the tank, so as to exert a scouring action thereagainst and maintain a partial separation of the milk therefrom. The direction of the air-blast causes also a forcible circulation of the milk, which assists in keeping all the heated surfaces scoured clean and bright.

By reason of the fact that the air travels along the walls of the tank and maintains a certain degree of separation of the milk therefrom I am enabled to use a temperature in the tank considerably higher than would otherwise be the case, and so hasten the process without danger of injuring the solubility and peptogenic qualities of the product by overheating. The greater the drop or difference of temperature between the milk and the jacket the more rapid is the process, and as the milk nearest the walls is in the greatest danger of being too highly heated the passage of the greatest volume of the air in the same neighborhood enables me to use a higher temperature in the jacket than if the air were equally distributed throughout the milk. In practice I find, therefore, that I can use a temperature in the jacket many degrees higher than that which would be injurious in the milk, the degree being apparently limited only by the available volume of air.

In order to prevent the milk which splashes up onto the walls from burning, and thus discoloring the product, it is necessary to keep the walls comparatively cool above the surface of the milk, and this is accomplished by keeping the water in the jacket at or below the level of the milk. For this purpose four outlet-cocks are shown at intervals in the height of the tank for controlling the level of the water in the jacket.

The air injection, accompanied by the heating of the milk from the jacket, is continued until the milk is reduced to a suitable consistency, preferably to about twenty or twenty-five per cent. of its original weight or to a consistency of a paste or batter which has just sufficient fluidity to cause it to run from a spoon, the temperature of the same being gradually reduced from about 120° to about 90° Fahrenheit and that in the jacket being reduced from about 150° to about 125° Fahrenheit. If the air-blast be maintained constant, a gradual reduction of temperature takes place automatically by the reduced heating-surface as the volume of milk diminishes. The process is then stopped and the product cooled, preferably by first shutting off the hot water and continuing the air injection, which rapidly cools the milk. The product is then run out by opening the valve $b$, the tube $f$ being, if desired, first removed. The batter-like product is received into one or more storage vessels C C, which may be tubs or buckets. Fig. 5 illustrates the condition of affairs at this point in the process. The vessels C C are then properly covered and placed in a cool place, the temperature of which should not exceed 60° nor fall below freezing. It is left for a few hours or until it sets into a practically solid mass. The product is then subdivided, preferably by breaking it up into lumps, which are exposed to a drying atmosphere, preferably by placing them on a tray D, the contents of the trays being turned or agitated at intervals to expose all portions to the air. The material is then subjected to mechanical stirring or pugging, preferably by such an apparatus as is shown in Fig. 2 at E, which represents the pug-mill. This mill consists of a cylinder $i$, fed by a hopper $j$ at one end and discharged into the chute $k$ at the other. Through it passes a radial shaft $l$, having stirring arms or blades $m$, which are preferably inclined so as to exert a screw-like action tending to force the material toward the outlet. Between these arms are preferably arranged fixed arms $m'$, as usual. The partly-dried lumps of milk are placed in the hopper $j$ and descend into the cylinder, where they are cut and stirred by the blades until the material is worked into homogeneous condition and is finally discharged in a constant stream of semisolid material from the chute $k$, whence it is conducted to or preferably falls directly to the vermicelli-machine. A suitable form of this machine is shown at F in Fig. 2. It has a hopper $n$ for receiving the material and a cylindrical chamber $o$, in which works a plunger or piston $p$, which may be forced down by a screw $q$, engaged by a threaded hub of a worm-wheel $q'$. The bottom of the cylinder $o$ is pierced with small holes $o'$. When the plunger is raised, the material falls from the hopper into the cylinder and upon forcing down the plunger is expelled through the small holes. It may fall upon an endless traveling apron $r$, from which it may be delivered onto the perforated bottom of a tray $s$, or it may be received directly into the tray. The further drying of the material thus subdivided into strings or shreds is conducted upon the trays $s$. These trays may be stacked in a dry atmosphere in any suitable room, but preferably are placed in a special drier, of which a suitable construction is shown at G in Fig. 3. This drier, which is of a well-known type, has an upright body or trunk $t$, into which air is forced at the bottom by a blower H and after ascending through the trunk is led off through a flue $t'$. The trays $s\ s$ are arranged one above another in the trunk and are preferably inserted at the top and caused to descend as the drying progresses, the trays containing the dried material being removed at the bottom. I have shown an opening or door $u$ at the top for inserting the trays and another, $u'$, at the bottom for removing them. To cause them to descend, I have shown them supported by projections upon endless chains $v\ v$, carried over rollers at top and bottom, any suitable mechanism (not shown) such as is well known in the art being provided for turning the rollers either continuously or intermittently, so as to lower the trays slowly or at intervals. This arrangement insures that the lowest and therefore driest layers of material shall receive the driest air. The air should be at a temperature not exceeding 120° Fahrenheit and preferably at 100° Fahrenheit. For heating the air I may employ a coil or radiator $w$, through which hot water is circulated from a pipe $w'$. By reason of the low specific heat of air, which causes it to take up heat slowly, the temperature of the water in these coils may somewhat exceed 140° Fahrenheit, provided a rapid and continuous circulation of air is maintained.

Preferably the material is first passed somewhat rapidly through the drier, so that upon being removed therefrom it is still sufficiently moist to be plastic. It is then again pugged and subdivided and again dried. For the second pugging it may be returned to the same pug-mill E or to a separate one and is then a second time passed through the vermicelli-machine F, and being received upon trays is returned to the same or preferably the second drier G. In this drier the drying is continued until the material is bone dry and reduced to shreds, rods, or filaments of hard brittle solid milk.

The vermicelli-machine F may be turned on its side, so as to deliver the shreds or strings of material horizontally if required. Any suitable deflector—such, for example, as an inclined plate, as shown at $r'$, Figs. 2 and 4— may be provided to intercept and deflect the exuding filaments, so as to break them off into short pieces.

Any other mechanism may be substituted for a pug-mill for the purpose of amalgamating, stirring, and rendering homogeneous the semisolid milk. Also other means than a vermicelli-machine or other device for forcing out the material through holes may be employed as the means for subdividing the semisolid milk. My invention is not limited to the use of these specific means.

The pug-mill E and vermicelli-machine F (shown Fig. 2) may, if desired, be combined into one machine, as shown at E F in Fig. 4, where the construction is the same as that of the mill E in Fig. 2, except that its delivery end is closed and formed with perforations $o'$ like those at the end of the cylinder $o$ in Fig. 2. In this construction reliance is placed upon the screw action or wedging thrust of the blades to force the material out through the perforations. Hence this machine is not adapted to operate on a material as dense or nearly dry as that shown in Fig. 2.

An important feature of my present invention is believed to be that the drier exterior portions and the moister interior portions of the milk are so thoroughly amalgamated or combined in the pug-mill as to result in a homogeneous material having a dryness corresponding to a mean between such outer and inner portions, whereupon a further subdivision of the product presents its surface in a moister condition than previously, whereby the drying is accelerated. These operations are preferably repeated once or more in order to render the process as expeditious as possible.

Prior to my present invention great difficulty has been experienced in conducting what I may term the "intermediate" stage of the process—that is, in carrying the product from the batter-like condition, to which it is reduced by the air-blast concentration, to a condition of approximate solidity, in which it is so nearly dry as to be readily desiccated by means of an ordinary drier, such as that shown at G. The material was extremely liable to fermentation during this intermediate stage, it being necessary to accelerate the drying and all efforts to this end being unsuccessful. The effort to finely subdivide the material and rapidly dry it by circulation of air at a low temperature was found to result in such slow drying that the milk would sour. The effort to accelerate the drying by using a higher temperature would result in changing the color of the product to a yellow or brown and rendering the casein insoluble. The improved treatment provided by my present invention successfully overcomes these difficulties. This improved treatment involves, first, leaving the concentrated milk or milk paste undisturbed and at a temperature below that favorable to fermentation for a sufficient time, whereby it is caused to set or nearly solidify. As the batter or paste is aerated or charged with minute air-bubbles this setting may be due to some action of the imprisoned air upon the milk, as, possibly, the absorption of moisture into the air-cells. Second, the repeated subdividing, drying, amalgamation, and resubdividing of the mass, whereby an extended surface is exposed for evaporation, and as this surface dries the dry outer portions and moist inner portions are worked together, so as to equalize the moisture and present a new surface for continued drying, this process being repeated as often as is desirable. The amalgamating or pugging is facilitated by the aeration of the product, which, by reason of being permeated by minute air-bubbles, is in a spongy condition.

So far as concerns the first stage of the process—namely, the evaporation by combined heating and air injection, which is claimed in my aforesaid application, Serial No. 22,105—I may proceed in the manner fully described in that application and by means of the apparatus therein set forth in lieu of that herein described.

I claim as my invention the following defined novel features, substantially as hereinbefore specified, namely:

1. The process of treating milk which consists in subjecting it to externally-applied heat whereby it is maintained at a temperature below the coagulating-point of albumen, and simultaneously blowing air into it in such volume that it is concentrated so rapidly as to prevent souring, continuing this concentration until it becomes of a pasty consistency, and then drying the pasty product by subdividing it and exposing it to the air at a temperature below the coagulating-point of albumen, until desiccated.

2. The process of desiccating milk which consists in removing the fatty solids and concentrating and desiccating the remainder so rapidly as to prevent souring, and at a temperature maintained below the coagulating-point of albumen so as to preserve the solubility and peptogenic qualities of the proteids.

3. The process of treating milk which consists in evaporating it at a temperature below the coagulating-point of albumen, and continuing the evaporation at such temperature until the milk is desiccated.

4. The process of treating milk which consists in evaporating it at a temperature below the coagulating-point of albumen, by blowing air into it until it becomes of a thick pasty consistency, and then drying it at such temperature to desiccation.

5. The process of treating milk which consists in evaporating it at a temperature below the coagulating-point of albumen by blowing air into it, then discontinuing the air-blast, and drying the pasty product at such temperature by circulation of air over it until a desiccated product results, and finally grinding this to powder.

6. The process of desiccating milk which consists in subjecting it to a temperature below the coagulating-point of albumen whereby the solubility and peptogenic quality of its proteids are preserved, and simultaneously blowing air into it, whereby it is concentrated so rapidly as to prevent souring, continuing this concentration until it becomes of a pasty consistency, and then drying the pasty product by subdividing it and exposing it to the air at a temperature below the coagulating-point of albumen, until desiccated.

7. The described process of desiccating milk which consists, first, in concentrating skimmed milk by heating it to a temperature maintained below the coagulating-point of albumen and blowing air into it, until it is reduced to the consistency of batter or paste, and second, leaving this paste to set or semisolidify, then subdividing it and exposing it to a drying atmosphere, then combining or amalgamating it by stirring or kneading to render it homogeneous, and again subdividing, and exposing to a drying atmosphere, the drying being conducted at a like temperature, and being continued to desiccation.

8. The described process for desiccating milk which consists, first, in concentrating skimmed milk by heating it to a temperature maintained below the coagulating-point of albumen and blowing air into it, until it is reduced to an aerated batter or paste, and second, leaving this paste in mass undisturbed until it sets or semisolidifies.

9. The described process for desiccating milk which consists, first, in concentrating skimmed milk by heating it to a temperature maintained below the coagulating-point of albumen and blowing air into it, until it is reduced to an aerated batter or paste, and second, leaving this paste in mass undisturbed until it sets or semisolidifies, then subdividing it and exposing it to a drying atmosphere until superficially dried, then combining or amalgamating it by stirring or kneading to render it homogeneous, and subdividing to expose an extended surface, and finally exposing to currents of air until dry, the temperature being maintained as above set forth.

10. The described milk product being a desiccated milk containing the non-fatty solids of the milk with their proteids in approximately as soluble and peptogenic condition as in normal milk.

11. The described milk product being a desiccated milk containing the non-fatty solids of the milk, namely, lactose, mineral matters and proteids, the latter being in a condition more soluble in water than in raw milk and equally peptogenic.

12. The described milk product being a pulverized desiccated milk resembling wheat-flour, and consisting of non-fatty milk solids soluble in water and as peptogenic as in normal milk.

In witness whereof I have hereunto signed my name in the presence of two subscribing witnesses.

JOSEPH H. CAMPBELL.

Witnesses:
ARTHUR C. FRASER,
DOMINGO A. USINA.